Patented Apr. 2, 1935

1,996,171

UNITED STATES PATENT OFFICE 1,996,171

METHOD OF TREATING EGGS

Mary E. Pennington and Arthur W. Thomas, New York, N. Y., assignors to The Borden Company, New York, N. Y., a corporation of New Jersey No Drawing. Application February 27, 1933, Serial No. 658,832

3 Claims. (Cl. 99—14)

This invention relates to egg material consisting of yolks, or whites, or a mixture thereof, after separation from the shells, and more particularly relates to control of the carbon dioxide content of egg material and to the egg product obtained by such control. The invention is particularly applicable to egg magma which has lost some or all of its natural carbon dioxide content or which is to be subjected to conditions causing a reduction of its carbon dioxide content. This application is a continuation in part of our copending application, Serial No. 514,697, filed February 9, 1931.

One of the objects of the present invention is to restore egg material which has lost some or all of its natural carbon dioxide content to substantially the condition of the contents of freshly laid spring eggs. Another object is to adjust the carbon dioxide content of egg material so that even after exposure to conditions causing a reduction of the carbon dioxide content thereof, the condition of the egg material will compare favorably with or be better than that of freshly laid spring eggs.

It has been found that eggs contain carbon dioxide as one of their natural constituents and that the amount of carbon dioxide varies considerably due to a number of factors, the most important being the conditions under which the eggs have been stored. That is, carbon dioxide being highly volatile tends to diffuse out through the membranes and shells of the eggs which operation may begin as soon as they are laid, and and it will continue to do so until equilibrium with the surrounding atmospheric conditions is reached. We believe that this escape of carbon dioxide is a cause of two undesirable effects with which the present invention is mainly concerned. One result is that the flavor of the egg changes for the worse; and the other, that as the egg becomes less acid it seems less and less able to resist the growth of bacteria therein. We have found that the carbon dioxide content of egg material can be adjusted so that egg material from which a part or even all of the nautral carbon dioxide has escaped is restored to substantially the condition of fresh laid eggs, and for certain purposes is even improved over that, although when putrefaction has actually set in, we do not claim that the addition of carbon dioxide will restore such "bad eggs" to their original condition. We have found that egg material can be advantageously treated before its exposure to conditions under which there will be a reduction of the carbon dioxide content thereof. The reduction of the carbon dioxide content may occur as explained above, and particularly when frozen egg magma is subjected to thawing. In order to avoid this ultimate shortage in the carbon dioxide content, the total carbon dioxide content of the egg magma is preferably raised sufficiently to include the amount to be lost into the atmosphere up to the time of use of the egg material and in addition thereto to include an amount of carbon dioxide at least equal to that present in the corresponding untreated parts of fresh spring eggs. In the case of frozen egg magma the carbon dioxide is added to the magma before freezing.

One of the principal features of the present invention is based upon the discovery that by intimately intermingling carbon dioxide with egg-meat either white, yolk or mixed white and yolk (especially this latter), in such a way that the carbon dioxide is incorporated in the egg material as such, and distributed therethrough, not only is the flavor of the egg material improved, but its power to resist the action of bacteria is restored to that of freshly laid eggs or even increased above that. While not wishing to be limited to any theory, it would seem that the latter effect is probably due to the increased acidity (determined by change of pH value) of the egg material.

It is to be understood that the invention is applicable to mixed egg meat magma which is to be placed in cold storage, but is not limited thereto, for mixed egg meat which is to be used shortly is decidedly improved by our method. It is notable that even when frozen mixed egg meat is kept in cold storage for considerable periods after carbon dioxide has been added thereto, it exhibits improved flavor and keeping quality after thawing, as compared with ordinary cold storage egg meat, and even some fresh eggs. One of the advantages of egg material treated according to the present invention lies in its properties when used in bakery products such as cakes, the taste and certain other qualities of which are markedly improved.

By way of a preferred example illustrative of our invention we will now describe a method of incorporating the carbon dioxide in the mixed egg meat. We have found that it is not enough simply to admit carbon dioxide into a container in which the egg material is placed, but it is necessary intimately to incorporate or dissolve the carbon dioxide in the egg material so that it is distributed throughout the same. Moreover, carbon dioxide seems to possess unique properties for present purposes, and it may be conjectured that it combines in some way with the protein of the eggs, but whatever the reason for its action may be, it appears, that in any event to be effective the carbon dioxide must be distributed throughout the egg material probably first dissolving in the fluid portions thereof. Of course, we do not intend that the term "dissolve" be strictly construed to define a true solution, but merely mean that the carbon dioxide is really in the mixed egg meat, and not just adjacent to or surrounding it, because if in bulk, the egg magma does not absorb appreciable amounts of carbon dioxide when merely exposed to an atmosphere of it. The desired result is probably best obtained by incorporation of the carbon dioxide in the mixed egg meat by feeding of the gas into the egg magma while the latter is being churned, although the churning is not deemed essential, sufficient gas being used to produce the desired percentage in the product.

While the invention is not limited to any definite proportions of carbon dioxide in the product we have found that in some cases, as where the natural carbon dioxide content of the egg magma has been lost or reduced and is to be restored, a fair value is in the neighborhood of 1 milligram of carbon dioxide per cubic centimeter of egg magma (mixed yolk and white), though this may vary considerably. When egg magma, before utilization, is to be exposed to conditions causing a reduction in the carbon dioxide content of the egg magma, the total content of carbon dioxide, that is, the total weight of carbon dioxide in each unit of volume of the egg magma, is preferably raised to include the amount to be lost into the atmosphere up to the time of use of the egg magma and in addition thereto to include an amount of carbon dioxide at least equal to that present in the corresponding parts of fresh spring eggs. While the gas is being added to the fluid, the churn or freezing cylinder or the like is preferably closed to the atmosphere, sufficient gas having been admitted prior to, during, or after, the churning operation, or being bubbled through the eggs, under pressure from an external source. Under sufficient pressure the bubbling of the gas may be ample to cause it to dissolve without churning or centrifuging, but mechanical agitation gives quicker and generally superior results.

An alternative method of introducing the carbon dioxide into the eggs is to place the egg magma in a container above an amount of "dry ice" (solidified carbon dioxide), and allow the "dry ice" to vaporize. With this process the vaporizing of the carbon dioxide may be sufficient to cause it to permeate the egg magma but if necessary they may be agitated. It may also be possible to generate this gas chemically within the egg material. As the amount of carbon dioxide which will permeate the egg material varies somewhat according to the pressure of surrounding gas and the temperature of the egg magma, it is advisable, especially at relatively low pressures to use more gas than is actually required in the eggs and stop the process when the egg magma shows by tests that it contains the desired proportion of the carbon dioxide. The most advantageous pressure to use and such details can be readily determined for the particular apparatus and character of egg material in each case.

It is obvious that the present invention is susceptible of numerous ramifications and variations not only in the proportions of carbon dioxide, which will vary with different grades of eggs, but also in the method of incorporating it in the eggs, and hence the invention is not to be limited to any of the particular details described, save by the scope of the appended claims.

We claim:—

1. The process of treating egg material after separating from the shells, and which has lost at least a portion of its initial carbon dioxide content, which comprises the step of dissolving such a quantity of carbon dioxide therein, uniformly throughout its body, by introducing the carbon dioxide below the surface of the body thereof, as will bring up the carbon dioxide content of the egg material to at least the amount normally present in the corresponding untreated parts of fresh spring eggs.

2. The process of treating egg material after separating from the shells, and which has lost at least a portion of its initial carbon dioxide content, which comprises the step of dissolving such a quantity of carbon dioxide therein, uniformly throughout its body, by introducing the carbon dioxide below the surface of the body thereof, as will bring up the carbon dioxide content of the egg material to at least the amount normally present in the corresponding untreated parts of fresh spring eggs and freezing the egg material promptly after such addition.

3. The process of treating egg magma, which comprises introducing carbon dioxide below the surface of the magma and uniformly dissolving throughout the body of the magma an amount of carbon dioxide at least sufficient to raise the total content thereof adequately to supply the losses of carbon dioxide to the atmosphere up to the time of use of the egg material and in addition thereto an amount of carbon dioxide at least equal to that present in the corresponding untreated parts of fresh spring eggs.

MARY E. PENNINGTON.
ARTHUR W. THOMAS.